US00RE42335E

(19) United States
(12) Reissued Patent
Man et al.

(10) Patent Number: US RE42,335 E
(45) Date of Reissued Patent: May 10, 2011

(54) SINGLE TRANSISTOR-CONTROL LOW-DROPOUT REGULATOR

(75) Inventors: Tsz Yin Man, Hong Kong (CN); Chi Yat Leung, Hong Kong (CN); Ka Nang Leung, Hong Kong (CN); Philip Kwok Tai Mok, Hong Kong (CN); John Man Sun Chan, Hong Kong (CN)

(73) Assignee: The Hong Kong University of Science and Technology, Hong Kong (CN)

(21) Appl. No.: 12/605,206

(22) Filed: Oct. 23, 2009

Related U.S. Patent Documents

Reissue of:
(64) Patent No.: 7,285,942
Issued: Oct. 23, 2007
Appl. No.: 11/369,893
Filed: Mar. 7, 2006

U.S. Applications:
(60) Provisional application No. 60/658,752, filed on Mar. 7, 2005.

(51) Int. Cl.
*G05F 1/40* (2006.01)

(52) U.S. Cl. ..... 323/274; 323/281; 323/224

(58) Field of Classification Search ..... 323/274, 323/281, 224, 226
See application file for complete search history.

(56) References Cited

U.S. PATENT DOCUMENTS

| | | | | |
|---|---|---|---|---|
| 6,188,211 | B1 * | 2/2001 | Rincon-Mora et al. | 323/280 |
| 6,414,537 | B1 | 7/2002 | Smith | |
| 6,759,836 | B1 | 7/2004 | Black | |
| 7,030,598 | B1 * | 4/2006 | Dow | 323/313 |
| 7,589,507 | B2 * | 9/2009 | Mandal | 323/273 |
| 2005/0242791 | A1 | 11/2005 | Rajapandian et al. | |

OTHER PUBLICATIONS

Notice of Allowability, mailed Jun. 27, 2007, for U.S. Appl. No. 11/369,893.
Hazuca, et al., "An Area-Efficient, Integrated, Linear Regulator with Ultra-Fast Load Regulation," 2004 Symposium on VLSI Circuits Digest of Technical Papers, pp. 218-221.

* cited by examiner

*Primary Examiner* — Shawn Riley
(74) *Attorney, Agent, or Firm* — Schwabe, Williamson & Wyatt, P.C.

(57) ABSTRACT

A low-dropout regulator with a single-transistor-control providing improved transient response and stability is disclosed. The single-transistor-control provides a dynamic resistance at the output of the regulator for minimizing undershoot and overshoot, and hence improves transient response. Since the single-control transistor reduces the output resistance of the regulator, the output pole is pushed to a sufficiently high frequency without affecting stability. Therefore, the limited choice of combinations of the output capacitance and its equivalent-series-resistance is substantially relaxed.

55 Claims, 3 Drawing Sheets

SINGLE TRANSISTOR-CONTROL LOW-DROPOUT REGULATOR

Matter enclosed in heavy brackets [ ] appears in the original patent but forms no part of this reissue specification; matter printed in italics indicates the additions made by reissue.

CROSS-REFERENCE TO RELATED APPLICATION

This application claims the benefits of U.S. Provisional Application No. 60/658,752 filed on Mar. 7, 2005, which is hereby incorporated herein by reference in its entirety.

FIELD OF THE INVENTION

This invention relates to a low-dropout regulator, and in particular, to a low-dropout regulator that has improved transient response and stability.

BACKGROUND OF THE INVENTION

A low-dropout (LDO) regulator accepts an unregulated input voltage ($V_{IN}$) and provides a regulated output voltage ($V_{OUT}$) that is nearly independent of output current (e.g. a load current). A PMOS pass transistor is used to minimize the voltage difference between the input and output of a LDO regulator, and hence increases power conversion efficiency.

FIG. 1 shows the schematic of a typical LDO regulator according to the art, which consists of a pass transistor, an error amplifier, a reference voltage, a feedback resistor network and an optional output capacitor. Frequency compensation to achieve stability in a typical LDO is necessary as there are two high-impedance nodes, which are at the error amplifier output and at the drain of pass transistor. To provide such frequency compensation dominant-pole compensation and pole-zero cancellation are commonly used in the art, but these limit the choices of combinations of the output capacitance ($C_{OUT}$) and its equivalent-series-resistance ($R_{ESR}$) for LDO regulator stability. Furthermore, since the loop bandwidth of a conventional LDO is degraded by dominant-pole compensation, optimization between stability and transient response is difficult to achieve.

SUMMARY OF THE INVENTION

According to the present invention there is provided a low-dropout regulator comprising:

(a) a pass transistor connected to an output terminal of said regulator, (b) a control transistor having a first electrode connected to the output terminal of said regulator, a second control electrode biased with a control voltage generated by a reference mirror circuit, and a third electrode connected to a DC-biasing circuit and a biasing-current source, (c) a DC-biasing circuit connected between a control electrode of the pass transistor and the third electrode of the control transistor, (d) a reference mirror circuit accepting a supply- and temperature-independent reference voltage and generating a control voltage applied to the control electrode of the control transistor, and (e) a first biasing-current source providing biasing to the control transistor and the DC-biasing circuit.

In preferred embodiments of the invention the pass transistor is a P-channel Metal-Oxide-Silicon Field-Effect-Transistor (PMOSFET) or a PNP bipolar junction transistor, and the pass transistor is connected in series between an input terminal and the output terminal of the regulator, wherein the first electrode of the control transistor is the low-impedance electrode and the third electrode of the control transistor is the output electrode, and wherein one end of the DC-biasing circuit is coupled to the input of the regulator. The control transistor provides ultra-low resistance at the output terminal of the regulator, and this resistance can be dynamically changed according to the output voltage of the regulator.

The control transistor may also be preferably either a PMOSFET or a PNP bipolar junction transistor. In such embodiments of the invention the gate/base electrode of the control transistor is biased with a control voltage generated by the reference mirror circuit, the source/emitter electrode of the control transistor is coupled to the output of the regulator, and the drain/collector electrode of the control transistor is connected to the DC-biasing circuit and the first biasing-current source.

In preferred embodiments of the invention the DC-biasing circuit provides a DC voltage difference between the control electrode of the pass transistor and the output electrode of the control transistor whereby the control transistor operates in the saturation region.

The DC-biasing circuit preferably comprises a second biasing-current source and a resistive element. In such an embodiment preferably the second biasing-current source is connected between the input terminal of the regulator and the control electrode of the pass transistor, the resistive element is interposed between the control electrode of the pass transistor and the output electrode of the control transistor, and the second biasing-current source provides biasing current to the resistive element in order to produce a DC voltage difference between the control electrode of the pass transistor and the output electrode of the control transistor.

The resistive element may be a resistor connected between the control electrode of the pass transistor and the output electrode of the control transistor, or alternatively may be an N-channel Metal-Oxide-Silicon Field-Effect-Transistor (NMOSFET) or a NPN bipolar junction transistor. If the resistive element is a NMOSFET or a NPN bipolar junction transistor then the source/emitter electrode of the NMOSFET/NPN bipolar junction transistor is coupled to the output electrode of the control transistor, the drain/collector electrode of the NMOSFET/NPN bipolar junction transistor is connected to the control electrode of the pass transistor, and the voltage applied on the gate/base electrode of the NMOSFET/NPN bipolar junction transistor is used to control the source-to-drain/emitter-to-collector resistance whereby a suitable DC voltage difference is provided between the control electrode of the pass transistor and the output electrode of the control transistor.

Preferably the reference mirror circuit comprises a diode-connected transistor, a current mirror, a transconductance $G_m$-cell and a third biasing-current source. It is particularly preferred that (within tolerances) the diode-connected transistor has the same dimensions and consumes the same current as the control transistor whereby the voltage across the low-impedance electrode and the control electrode of both the diode-connected transistor and the control transistor are the same whereby the output voltage of the regulator equals the voltage applied to the low-impedance electrode of the diode-connected transistor.

The diode-connected transistor may be a PMOSFET or a PNP bipolar junction transistor. In such embodiments preferably both the drain/collector electrode and the gate/base electrode of the diode-connected transistor and the third biasing-current source are connected to form the output terminal of the reference mirror circuit and thereby generating a control voltage biased to the control electrode of the control transistor.

The current mirror may comprise two PMOSFETs or PNP bipolar junction transistors. In such embodiments the source/emitter electrodes of both the PMOSFETs/PNP bipolar junction transistors are coupled to the input terminal of regulator, and one of the PMOSFETs/PNP bipolar junction transistors is diode-connected to sense the output current of $G_m$-cell, whereby by connecting the gate/base electrodes of both PMOSFETs/PNP bipolar junction transistors the sensed output current of $G_m$-cell is mirrored to the low-impedance electrode of the diode-connected transistor.

Preferably both the current mirror and the $G_m$-cell mirror the supply- and temperature-independence reference voltage to the low-impedance electrode of the diode-connected transistor with current-driving capability.

It will also be understood by those skilled in the art that instead of using PMOSFET/PNP transistors for the pass and control transistors, an alternative circuit may be configured using NMOSFET/NPN transistors.

Therefore in an alternative embodiment of the invention the pass transistor is a N-channel Metal-Oxide-Silicon Field-Effect-Transistor (NMOSFET) or a NPN bipolar junction transistor, wherein the pass transistor is connected in series between the output terminal of the regulator and ground, wherein the first electrode of the control transistor is the low-impedance electrode and the third electrode of the control transistor is the output electrode, and wherein one end of the DC-biasing circuit is coupled to ground. The control transistor provides ultra-low resistance at the output terminal of the regulator, which resistance can be dynamically changed according to the output voltage of the regulator.

In this embodiment the control transistor may also be a NMOSFET or a NPN bipolar junction transistor. The gate/base electrode of the control transistor may be biased with a control voltage generated by the reference mirror circuit, the source/emitter electrode of the control transistor is coupled to the output of the regulator, and the drain/collector electrode of the control transistor is connected to the DC-biasing circuit and the first biasing-current source.

The DC-biasing circuit may provide a DC voltage difference between the control electrode of the pass transistor and the output electrode of the control transistor whereby the control transistor operates in the saturation region.

The DC-biasing circuit preferably comprises a second biasing-current source and a resistive element. The second biasing-current source may be connected between ground and the control electrode of the pass transistor, the resistive element is interposed between the control electrode of the pass transistor and the output electrode of the control transistor, and the second biasing-current source provides biasing current to the resistive element, which produces a DC voltage difference between the control electrode of said pass transistor and the output electrode of the control transistor. The resistive element may be a resistor connected between the control electrode of the pass transistor and the output electrode of the control transistor, or alternatively may be a P-channel Metal-Oxide-Silicon Field-Effect-Transistor (PMOSFET) or a PNP bipolar junction transistor.

Preferably the source/emitter electrode of the PMOSFET/PNP bipolar junction transistor is coupled to the output electrode of the control transistor, the drain/collector electrode of the PMOSFET/PNP bipolar junction transistor is connected to the control electrode of the pass transistor, and the voltage applied on the gate/base electrode of the PMOSFET/PNP bipolar junction transistor is used to control the source-to-drain/emitter-to-collector resistance whereby a suitable DC voltage difference is provided between the control electrode of the pass transistor and the output electrode of the control transistor.

The reference mirror circuit may comprise a diode-connected transistor, a current mirror, a transconductance $G_m$-cell and a third biasing-current source. Preferably, within tolerances the diode-connected transistor has the same dimensions and consumes the same current as the control transistor. Preferably within tolerances the voltage across the low-impedance electrode and the control electrode of both the diode-connected transistor and the control transistor are the same whereby the output voltage of said regulator equals the voltage applied to the low-impedance electrode of the diode-connected transistor. The diode-connected transistor may be a NMOSFET or a NPN bipolar junction transistor. Both the drain/collector electrode and the gate/base electrode of the diode-connected transistor and the third biasing-current source may be connected to form the output terminal of the reference mirror circuit and thereby generating a control voltage biased to the control electrode of the control transistor.

In one embodiment of the invention the current mirror comprises two NMOSFETs or NPN bipolar junction transistors. In this embodiment the source/emitter electrodes of both NMOSFETs/NPN bipolar junction transistors are coupled to ground, and one of the NMOSFETs/NPN bipolar junction transistors is diode-connected to sense the output current of $G_m$-cell, whereby by connecting the gate/base electrodes of both said NMOSFETs/NPN bipolar junction transistors the sensed output current of $G_m$-cell is mirrored to the low-impedance electrode of the diode-connected transistor.

Preferably both the current mirror and the $G_m$-cell mirror the supply- and temperature-independence reference voltage to the low-impedance electrode of the diode-connected transistor with current-driving capability. Preferably the reference mirror circuit accepts a supply- and temperature-independent reference voltage and mirrors this reference voltage to the output terminal of the regulator by generating a control voltage biased to the control electrode of the control transistor.

BRIEF DESCRIPTION OF THE DRAWINGS

Some embodiments of the invention will now be described by way of example with reference to the accompanying drawings, in which.

DETAILED DESCRIPTION OF PREFERRED EMBODIMENTS

This invention provides a LDO regulator with improved transient response and stability based on the concept of providing ultra-low resistance, which can be dynamically changed according to $V_{OUT}$, at the output of the LDO regulator, even though the pass transistor itself has high output resistance.

Figure 1:
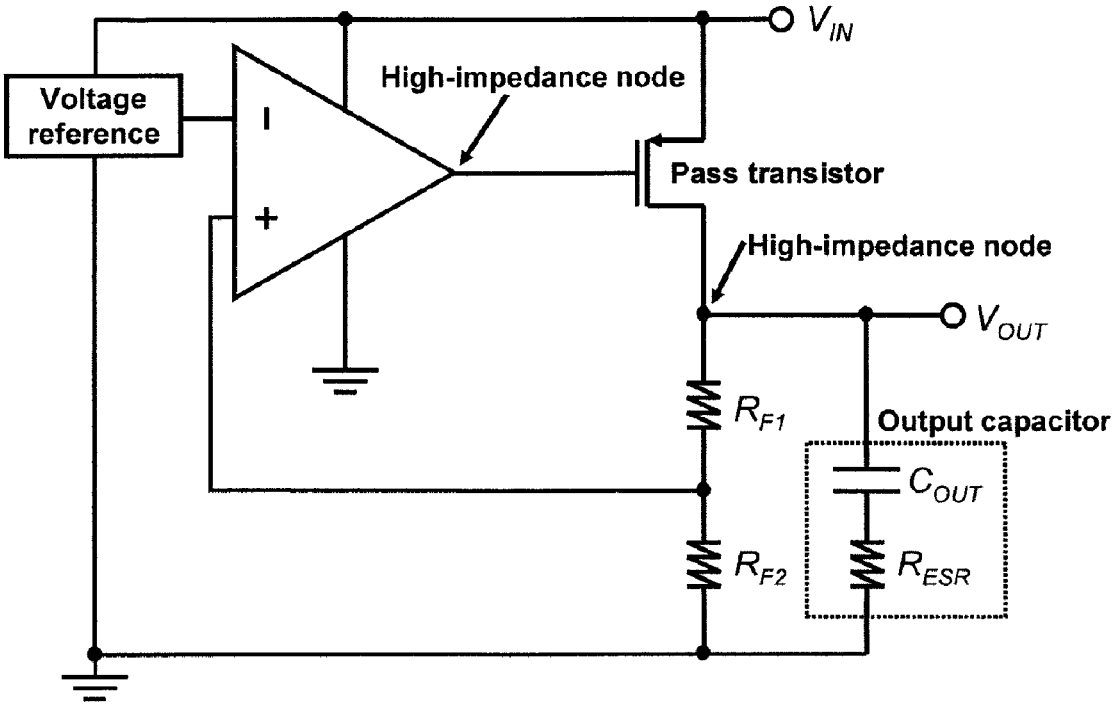
FIG. 1 PRIOR ART
FIG. 1 is a schematic illustration of an art LDO regulator.
Figure 2:
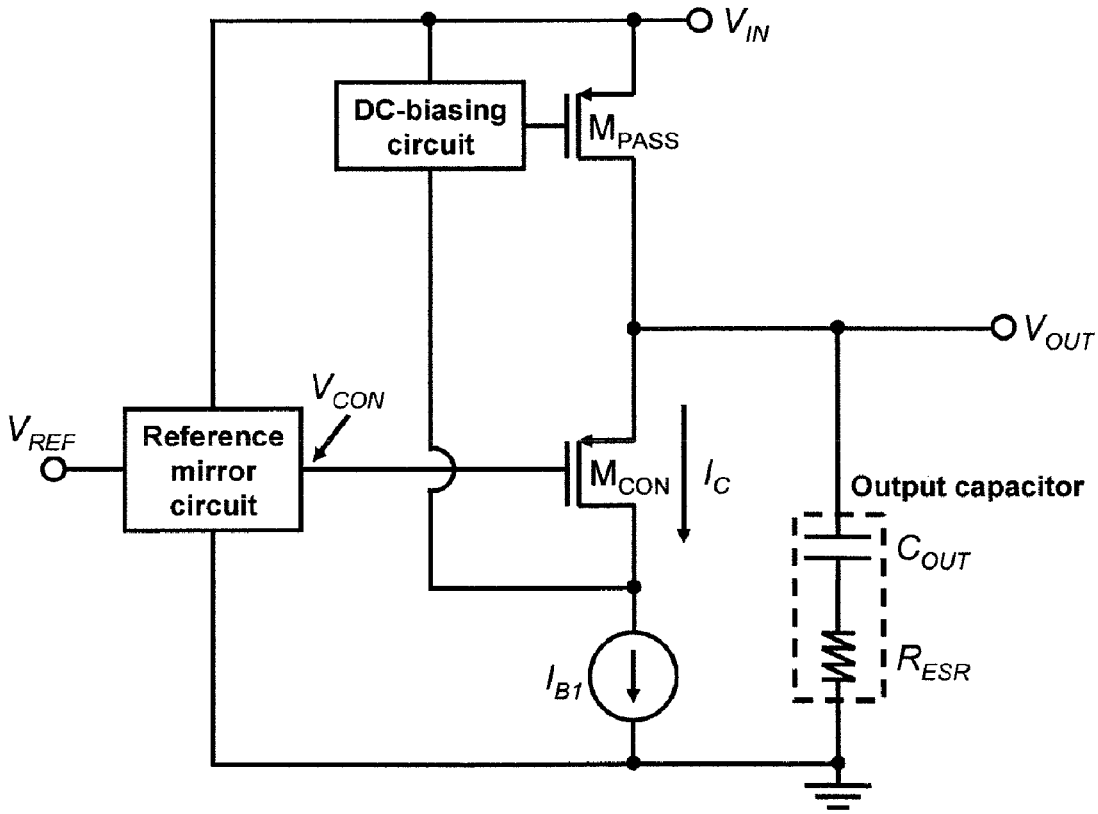
FIG. 2 is a schematic illustrating the structure of a LDO regulator according to an embodiment of the invention.

FIG. 2 shows the basic structure of an embodiment of the LDO regulator in accordance with this invention, including a pass transistor $M_{PASS}$, a control transistor $M_{CON}$, a DC-biasing circuit, a reference mirror circuit, a first biasing-current source $I_{B1}$ and an optional output capacitor. $M_{PASS}$ is interposed between $V_{IN}$ and $V_{OUT}$. The gate electrode of $M_{PASS}$ is coupled to one end of the DC-biasing circuit. The source electrode of $M_{CON}$ is connected to $V_{OUT}$. The gate electrode of $M_{CON}$ is biased by a control voltage $V_{CON}$, which is generated by the reference mirror circuit. The drain electrode of $M_{CON}$ is coupled to one end of the current source and one end of the DC-biasing circuit. Another end of current source is coupled to ground. $M_{CON}$ produces a control current $I_C$ that is proportional to the difference between $V_{OUT}$ and $V_{CON}$. Both $I_C$ and $I_{B1}$ provide information to the DC-biasing circuit, which determines the gate voltage of $M_{PASS}$ for regulating $V_{OUT}$.

Although $M_{PASS}$ operates in saturation region, the output resistance is reduced by the source electrode of $M_{CON}$. In addition, feedback action further reduces the output resistance by at least two orders of magnitude due to the high voltage gain of $M_{CON}$. Since the pole formed by $C_{OUT}$ and output resistance is located at a sufficiently high frequency without affecting stability of the LDO regulator, the limited choices of combinations of $C_{OUT}$ and $R_{ESR}$ are substantially relaxed.

The output resistance $R_{OUT}$ of a LDO regulator is given by the equation $$R_{OUT} = \frac{1}{g_{mc}(1 + g_{mp}r_b)}$$

where a) $g_{mp}$ and $g_{mc}$ are the transconductance of $M_{PASS}$ and $M_{CON}$, respectively, and b) $r_b$ is the total resistance contributed by devices connecting to the gate electrode of $M_{PASS}$.

The transient response of a LDO regulator also benefits from $M_{CON}$ according to this invention. When load current is increased, the decreased $V_{OUT}$ increases the resistance of $M_{CON}$, which minimizes the discharge of the output capacitor, and hence reduces the undershooting voltage. Moreover, $I_C$ produced by $M_{CON}$ is reduced due to the decreased $V_{OUT}$. The gate of $M_{PASS}$ is discharged by $I_{B1}$ through the DC-biasing circuit to match heavy load condition. While load current is reduced, the resistance of $M_{CON}$ is reduced due to increased $V_{OUT}$. As $M_{PASS}$ cannot respond immediately, the excess current of $M_{PASS}$ is sunk by the low-resistance $M_{CON}$ to minimize the charge of the output capacitor and the overshoot voltage. In addition, the increased $V_{OUT}$ triggers $M_{CON}$ to produce more $I_C$, which increases the gate voltage of $M_{PASS}$ through the DC-biasing circuit to match light load condition.

Figure 3:
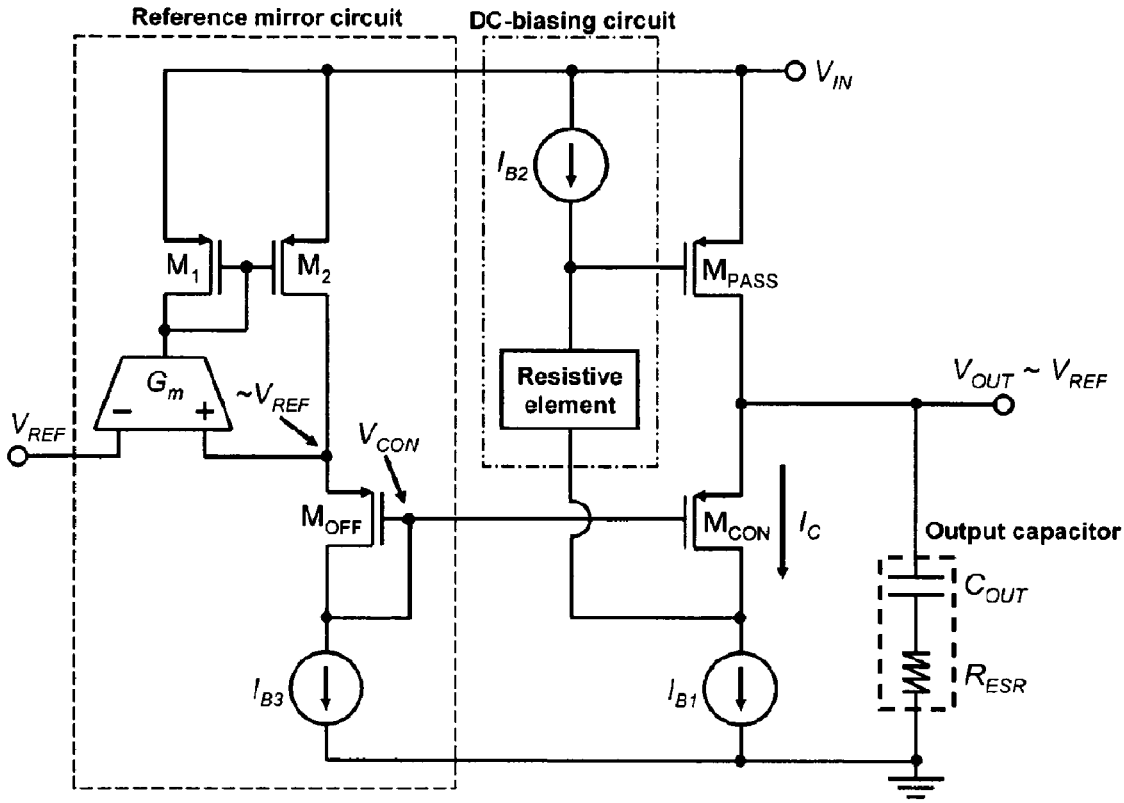
FIG. 3 is a schematic illustration of the embodiment of FIG. 2.

FIG. 3 shows in detail a circuit for realizing the general structure of FIG. 2 to form a LDO regulator according to an embodiment of this invention. In this embodiment the reference mirror circuit consists of a third biasing-current source $I_{B3}$, which has the same current level as the biasing current $I_{B1}$ of $M_{CON}$, a diode-connected transistor $M_{OFF}$, a current mirror consisting of two transistors $M_1$ and $M_2$ and a transconductance $G_m$-cell. The source electrode of $M_{OFF}$ is connected to the drain electrode of $M_2$ and the non-inverting input of $G_m$-cell. Both the drain electrode and the gate electrode of $M_{OFF}$ are coupled together to form a diode-connection, producing a $V_{CON}$ for biasing the gate electrode of $M_{CON}$. The biasing-current source inside the reference mirror circuit is interposed between the output of the reference circuit and the ground. The source electrodes of both $M_1$ and $M_2$ are coupled to $V_{IN}$. The gate and drain electrodes of $M_1$ and gate electrode of $M_2$ are connected and driven by the output of $G_m$-cell. $V_{REF}$ is coupled to the inverting input of $G_m$-cell.

Preferably, at least within tolerances, the diode-connected transistor $M_{OFF}$ has the same dimensions and consumes approximately the same current as the control transistor $M_{CON}$. The advantage of this is that the voltage across the low-impedance electrode and the control electrode of both $M_{OFF}$ and $M_{CON}$ are the same whereby the output voltage of the regulator equals the voltage applied to the low-impedance electrode of $M_{OFF}$. Since $M_{OFF}$ and $M_{CON}$ have the same size and the same biasing current, the dependence of the gate-to-source voltage of $M_{CON}$ on $V_{OUT}$ is eliminated by $M_{OFF}$, and thus, $V_{OUT}$ equals the voltage applied to the source electrode of $M_{OFF}$. The current mirror and $G_m$-cell are used to provide $V_{REF}$ with driving capability to the source electrode of $M_{OFF}$. Therefore, the reference circuit accepts a supply- and temperature-independent $V_{REF}$, and generates $V_{CON}$ to the source electrode of $M_{CON}$. Hence, the LDO regulator regulates $V_{OUT}$ closely to $V_{REF}$ applied to the reference circuit.

The DC-biasing circuit consists of a second biasing-current source $I_{B2}$ and a resistive element or a voltage level shifting element. The resistive element may be either a resistor or may be either a NMOSFET or NPN bipolar junction transistor. In the latter case the source/emitter electrode of the NMOSFET/NPN bipolar junction transistor is coupled to the output electrode of the control transistor, the drain/collector electrode of the NMOSFET/NPN bipolar junction transistor is connected to the control electrode of the pass transistor, and the voltage applied on the gate/base electrode of the NMOSFET/NPN bipolar junction transistor is used to control the source-to-drain/emitter-to-collector resistance whereby a suitable DC voltage difference is provided between the control electrode of the pass transistor and the output electrode of the control transistor.

The biasing-current source inside the DC-biasing circuit is connected between $V_{IN}$ and the gate electrode of $M_{PASS}$. The resistive element is interposed between the gate electrode of $M_{PASS}$ and the drain electrode of $M_{CON}$. Both $I_{B2}$ and the resistive element create a DC-offset voltage between the drain electrode of $M_{CON}$ and the gate electrode of $M_{PASS}$. $M_{CON}$ is guaranteed to operate in saturation region under a wide range of $V_{IN}$, and therefore extends the input voltage range of a LDO regulator.

Figure 4:
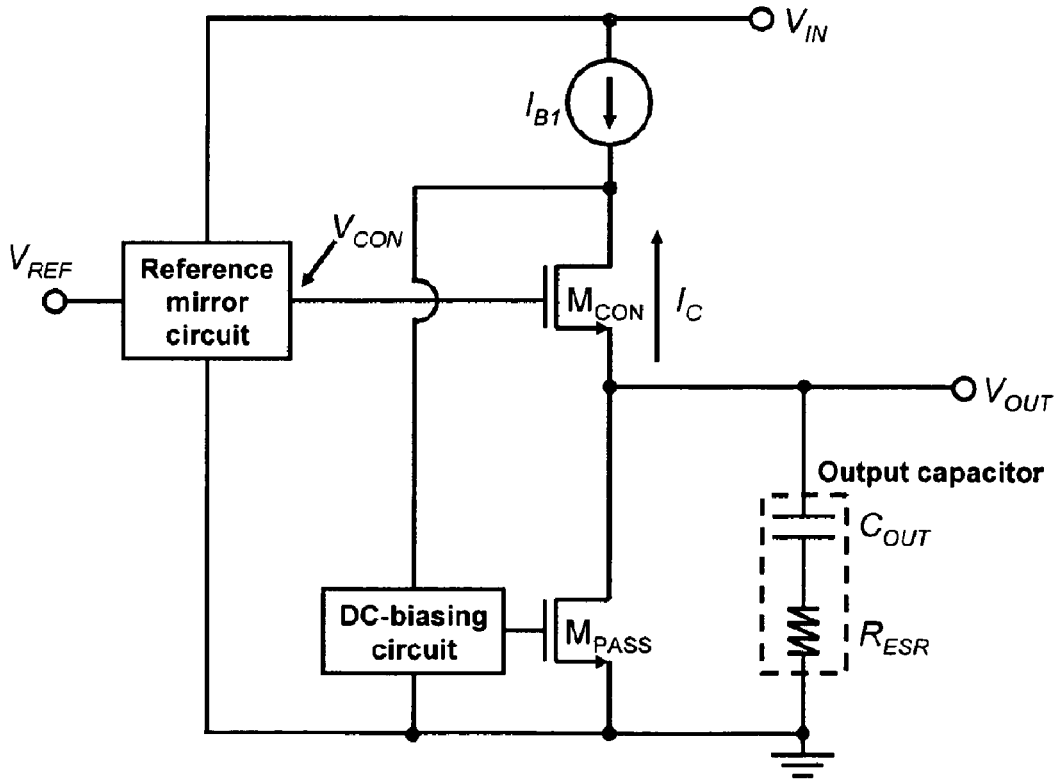
FIG. 4 is a schematic illustrating the structure of an LDO regulator according to an alternative embodiment of the invention.
Figure 5:
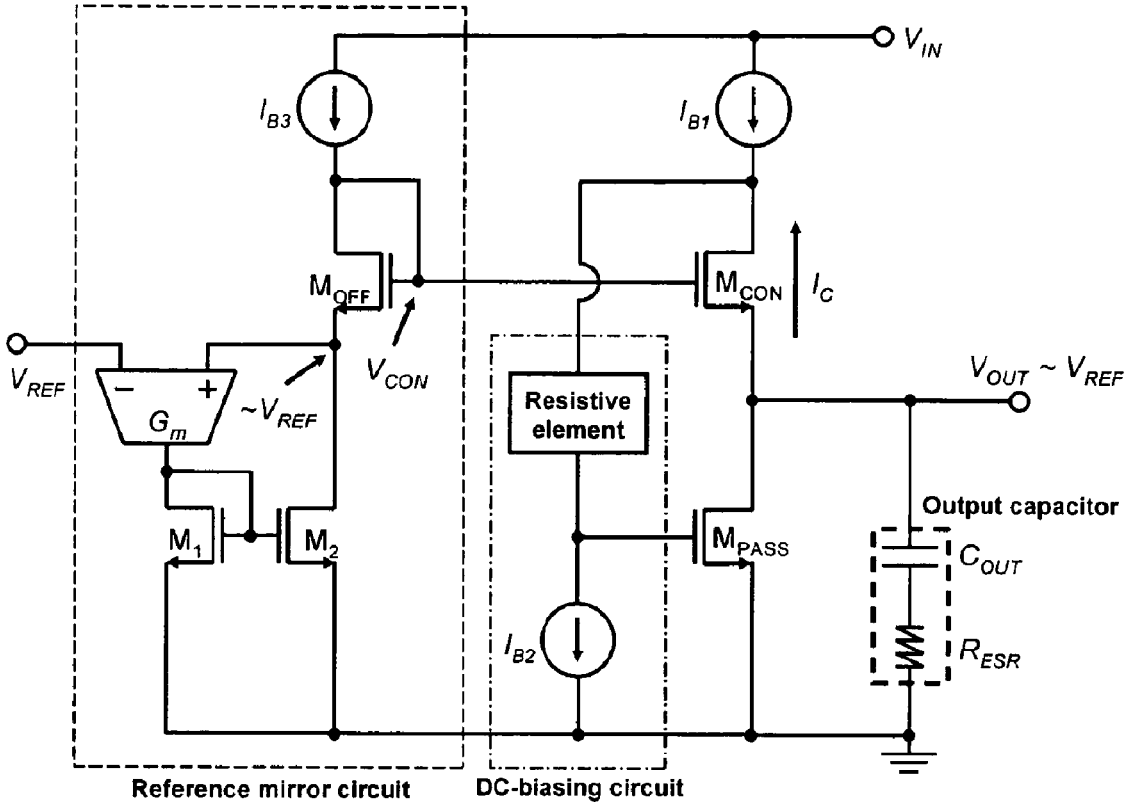
FIG. 5 is a schematic illustration of the embodiment of FIG. 4.

It will be understood that while in the embodiment shown in FIGS. 2 and 3 the transistors $M_{PASS}$, $M_{CON}$ and $M_{OFF}$ are all shown as PMOSFET transistors it will be understood that they could be placed by PNP bipolar junction transistors (BJT). If PNP BJTs are used then it will be understood that in the above description the MOSFET electrode terminology gate/source/drain is replaced by the BJT electrode terminology base/emitter/collector respectively. Moreover, it will also be understood by those skilled in the art that a complementary circuit could be designed using NMOSFET or NPN transistors in which the PMOSFET or PNP transistors are replaced by NMOSFET or NPN transistors with appropriate reconfiguration of the circuit. An example of how this might be done is shown in FIGS. 4 and 5.

It will be seen from the above that the present invention, at least in its preferred forms, provides a LDO regulator that unlike a conventional LDO does not require a tradeoff between stability and transient response, but rather provides a LDO regulator with simultaneously both improved transient response and stability.

The LDO regulator, at least in its preferred forms, consists of a pass transistor, a control transistor, a DC-biasing circuit, a reference mirror circuit, a biasing-current source and an optional output capacitor. The pass transistor connects in series between the input terminal and the output terminal of the LDO regulator. The control electrode of the control transistor is biased with a control voltage generated by the reference mirror circuit. The output terminal of the regulator is connected to the low-impedance electrode of the control transistor, which produces a control current proportional to the difference between the $V_{OUT}$ and the control voltage. The control current controls the pass transistor through the DC-biasing circuit for regulating $V_{OUT}$ to a pre-defined value.

In steady-state operation, the output resistance of the LDO regulator is significantly reduced by both the low-impedance electrode of the control transistor connected to the output terminal of the regulator and the feedback used for regulation. Hence, the pole location at the output of the LDO regulator is pushed to a sufficiently high frequency without affecting stability, and this approach relaxes the limited choices of combinations of $C_{OUT}$ and $R_{ESR}$.

During load transient, the capacitor at the output of the regulator (e.g. an optional output capacitor or regulator output parasitic capacitor) is either charged by the excess current of the pass transistor or discharged by the increased load current, and the $V_{OUT}$ is changed accordingly. The control transistor senses the change of $V_{OUT}$, and produces a corresponding control current for regulation. More importantly, the resistance of the control transistor connected to the output of the regulator is reduced to sink the excess pass transistor current or increased to minimize the discharge of the output capacitor, and therefore improves transient response

The invention claimed is:

1. A low-dropout regulator comprising:

(a) a pass transistor connected to an output terminal of said regulator, (b) a control transistor having a first electrode connected to the output terminal of said regulator, a second control electrode biased with a control voltage generated by a reference mirror circuit, and a third electrode connected to a DC-biasing circuit and a biasing-current source, (c) a DC-biasing circuit connected between a control electrode of the pass transistor and the third electrode of the control transistor, (d) a reference mirror circuit accepting a supply- and temperature-independent reference voltage and generating a control voltage applied to the control electrode of the control transistor, and (e) a first biasing-current source providing biasing to the control transistor and the DC-biasing circuit.

2. A regulator as claimed in claim 1 wherein said pass transistor is a P-channel Metal-Oxide-Silicon Field-Effect-Transistor (PMOSFET) or a PNP bipolar junction transistor, wherein the pass transistor is connected in series between an input terminal and the output terminal of said regulator, wherein the first electrode of the control transistor is the low-impedance electrode and the third electrode of the control transistor is the output electrode, and wherein one end of the DC-biasing circuit is coupled to the input of the regulator.

3. A regulator as claimed in claim 2 wherein said control transistor provides ultra-low resistance at the output terminal of said regulator, which resistance can be dynamically changed according to the output voltage of said regulator.

4. A regulator as claimed in claim 2 wherein said control transistor is a PMOSFET or a PNP bipolar junction transistor.

5. A regulator as claimed in claim 4 wherein the gate/base electrode of said control transistor is biased with a control voltage generated by the reference mirror circuit, the source/emitter electrode of said control transistor is coupled to the output of said regulator, and the drain/collector electrode of said control transistor is connected to the DC-biasing circuit and the first biasing-current source.

6. A regulator as claimed in claim 2 wherein said DC-biasing circuit provides a DC voltage difference between the control electrode of the pass transistor and the output electrode of the control transistor whereby the control transistor operates in the saturation region.

7. A regulator as claimed in claim 2 wherein said DC-biasing circuit comprises a second biasing-current source and a resistive element.

8. A regulator as claimed in claim 7 wherein the second biasing-current source is connected between the input terminal of said regulator and the control electrode of the pass transistor, the resistive element is interposed between the control electrode of said pass transistor and the output electrode of said control transistor, and wherein the second biasing-current source provides biasing current to the resistive element, which produces a DC voltage difference between the control electrode of said pass transistor and the output electrode of said control transistor.

9. A regulator as claimed in claim 7 wherein said resistive element is a resistor connected between the control electrode of the pass transistor and the output electrode of the control transistor.

10. A regulator as claimed in claim 7 wherein said resistive element is an N-channel Metal-Oxide-Silicon Field-Effect-Transistor (NMOSFET) or a NPN bipolar junction transistor.

11. A regulator as claimed in claim 10 wherein the source/emitter electrode of said NMOSFET/NPN bipolar junction transistor is coupled to the output electrode of the control transistor, the drain/collector electrode of said NMOSFET/NPN bipolar junction transistor is connected to the control electrode of the pass transistor, and wherein the voltage applied on the gate/base electrode of said NMOSFET/NPN bipolar junction transistor is used to control the source-to-drain/emitter-to-collector resistance whereby a DC voltage difference is provided between the control electrode of said pass transistor and the output electrode of said control transistor.

12. A regulator as claimed in claim 2 wherein said reference mirror circuit comprises a diode-connected transistor, a current mirror, a transconductance $G_m$-cell and a third biasing-current source.

13. A regulator as claimed in claim 12 wherein within tolerances said diode-connected transistor has the same dimension and consumes the same current as the control transistor.

14. A regulator as claimed in claim 12 wherein within tolerances the voltage across the low-impedance electrode and the control electrode of both said diode-connected transistor and said control transistor are the same whereby the output voltage of said regulator equals the voltage applied to the low-impedance electrode of said diode-connected transistor.

15. A regulator as claimed in claim 12 wherein said diode-connected transistor is a PMOSFET or a PNP bipolar junction transistor.

16. A regulator as claimed in claim 15 wherein both the drain/collector electrode and the gate/base electrode of said diode-connected transistor and the third biasing-current source are connected to form the output terminal of the reference mirror circuit and thereby generating a control voltage biased to the control electrode of the control transistor.

17. A regulator as claimed in claim 12 wherein said current mirror comprises two PMOSFETs or PNP bipolar junction transistors.

18. A regulator as claimed in claim 17 wherein the source/emitter electrodes of both said PMOSFETs/PNP bipolar junction transistors are coupled to the input terminal of regulator, and wherein one of the said PMOSFETs/PNP bipolar junction transistors is diode-connected to sense the output current of $G_m$-cell, whereby by connecting the gate/base electrodes of both said PMOSFETs/PNP bipolar junction transistors the sensed output current of $G_m$-cell is mirrored to the low-impedance electrode of the diode-connected transistor.

19. A regulator as claimed in claim 12 wherein both said current mirror and said $G_m$-cell mirror the supply- and temperature-independence reference voltage to the low-impedance electrode of the diode-connected transistor with current-driving capability.

20. A regulator as claimed in claim 12 wherein said reference mirror circuit accepts a supply- and temperature-independent reference voltage and mirrors this reference voltage to the output terminal of said regulator by generating a control voltage biased to the control electrode of the control transistor.

21. A regulator as claimed in claim 1 wherein said pass transistor is a N-channel Metal-Oxide-Silicon Field-Effect-Transistor (NMOSFET) or a NPN bipolar junction transistor, wherein the pass transistor is connected in series between the output terminal of said regulator and ground, wherein the first electrode of the control transistor is the low-impedance electrode and the third electrode of the control transistor is the output electrode, and wherein one end of the DC-biasing circuit is coupled to ground.

22. A regulator as claimed in claim 21 wherein said control transistor provides ultra-low resistance at the output terminal of said regulator, which resistance can be dynamically changed according to the output voltage of said regulator.

23. A regulator as claimed in claim 21 wherein said control transistor is a NMOSFET or a NPN bipolar junction transistor.

24. A regulator as claimed in claim 23 wherein the gate/base electrode of said control transistor is biased with a control voltage generated by the reference mirror circuit, the source/emitter electrode of said control transistor is coupled to the output of said regulator, and the drain/collector electrode of said control transistor is connected to the DC-biasing circuit and the first biasing-current source.

25. A regulator as claimed in claim 21 wherein said DC-biasing circuit provides a DC voltage difference between the control electrode of the pass transistor and the output electrode of the control transistor whereby the control transistor operates in the saturation region.

26. A regulator as claimed in claim 21 wherein said DC-biasing circuit comprises a second biasing-current source and a resistive element.

27. A regulator as claimed in claim 26 wherein the second biasing-current source is connected between ground and the control electrode of the pass transistor, the resistive element is interposed between the control electrode of said pass transistor and the output electrode of said control transistor, and wherein the second biasing-current source provides biasing current to the resistive element, which produces a DC voltage difference between the control electrode of said pass transistor and the output electrode of said control transistor.

28. A regulator as claimed in claim 26 wherein said resistive element is a resistor connected between the control electrode of the pass transistor and the output electrode of the control transistor.

29. A regulator as claimed in claim 26 wherein said resistive element is a P-channel Metal-Oxide-Silicon Field-Effect-Transistor (PMOSFET) or a PNP bipolar junction transistor.

30. A regulator as claimed in claim 29 wherein the source/emitter electrode of said PMOSFET/PNP bipolar junction transistor is coupled to the output electrode of the control transistor, the drain/collector electrode of said PMOSFET/PNP bipolar junction transistor is connected to the control electrode of the pass transistor, and wherein the voltage applied on the gate/base electrode of said PMOSFET/PNP bipolar junction transistor is used to control the source-to-drain/emitter-to-collector resistance whereby a DC voltage difference is provided between the control electrode of said pass transistor and the output electrode of said control transistor.

31. A regulator as claimed in claim 21 wherein said reference mirror circuit comprises a diode-connected transistor, a current mirror, a transconductance $G_m$-cell and a third biasing-current source.

32. A regulator as claimed in claim 31 wherein within tolerances said diode-connected transistor has the same dimension and consumes the same current as the control transistor.

33. A regulator as claimed in claim 31 wherein within tolerances the voltage across the low-impedance electrode and the control electrode of both said diode-connected transistor and said control transistor are the same whereby the output voltage of said regulator equals the voltage applied to the low-impedance electrode of said diode-connected transistor.

34. A regulator as claimed in claim 31 wherein said diode-connected transistor is a NMOSFET or a NPN bipolar junction transistor.

35. A regulator as claimed in claim 34 wherein both the drain/collector electrode and the gate/base electrode of said diode-connected transistor and the third biasing-current source are connected to form the output terminal of the reference mirror circuit and thereby generating a control voltage biased to the control electrode of the control transistor.

36. A regulator as claimed in claim 31 wherein said current mirror comprises two NMOSFETs or NPN bipolar junction transistors.

37. A regulator as claimed in claim 36 wherein the source/emitter electrodes of both said NMOSFETs/NPN bipolar junction transistors are coupled to ground, and wherein one of the said NMOSFETs/NPN bipolar junction transistors is diode-connected to sense the output current of $G_m$-cell, whereby by connecting the gate/base electrodes of both said NMOSFETs/NPN bipolar junction transistors the sensed output current of $G_m$-cell is mirrored to the low-impedance electrode of the diode-connected transistor.

38. A regulator as claimed in claim 31 wherein both said current mirror and said $G_m$-cell mirror the supply- and temperature-independence reference voltage to the low-impedance electrode of the diode-connected transistor with current-driving capability.

39. A regulator as claimed in claim 31 wherein said reference mirror circuit accepts a supply- and temperature-independent reference voltage and mirrors this reference voltage to the output terminal of said regulator by generating a control voltage biased to the control electrode of the control transistor.

*40. A regulator, comprising:*

*a pass transistor;*

*a control transistor;*

*a DC-biasing circuit having a first end coupled to a first node of the pass transistor, a second end coupled to a second node of the pass transistor, and a third end coupled to the control transistor;*

*a reference mirror circuit configured to receive a supply and temperature-independent reference voltage, wherein the reference mirror circuit is further configured to apply a control voltage to the control transistor; and*

*a current source configured to bias the control transistor and the DC-biasing circuit.*

*41. The regulator of claim 40, wherein the pass transistor is coupled to an output node of the regulator.*

*42. The regulator of claim 40, wherein the control transistor comprises a first control node coupled to an output node of the regulator, a second control node coupled to the reference mirror circuit, and a third control node coupled to the DC-biasing circuit and to the current source, wherein the control transistor is configured to be biased by the control voltage.*

*43. The regulator of claim 42, wherein the pass transistor is a P-channel Metal-Oxide Silicon Field-Effect Transistor (PMOSFET) or a PNP bipolar junction transistor, wherein the pass transistor is coupled in series between an input node of the regulator and the output node of the regulator, wherein a first control transistor node is a low-impedance node and a second control transistor node is coupled to the output node, and wherein the first end of the DC-biasing circuit is coupled to the input node.*

*44. The regulator of claim 40, wherein the pass transistor is an N-channel Metal-Oxide Silicon Field-Effect Transistor (NMOSFET) or a NPN bipolar junction transistor, wherein the pass transistor is coupled to an output node of the regulator and to ground, wherein a first control transistor node is a low-impedance node and a second control transistor node is coupled to the output node, and wherein the first end of the DC-biasing circuit is coupled to ground.*

*45. A regulator, comprising:*

*a pass transistor;*

*a DC-biasing circuit;*

*a reference mirror circuit configured to produce a control voltage; and*

*a control transistor coupled to the reference mirror circuit, the pass transistor, and an output node of the regulator, wherein the control transistor is configured to produce a control current as a function of a difference between an output voltage of the regulator and the control voltage;*

*wherein the DC-biasing circuit is configured to control the pass transistor according to the control current to regulate an output voltage on the output node.*

*46. The regulator of claim 45, further comprising an output capacitor coupled to the output node.*

*47. The regulator of claim 45, wherein the control transistor is further configured to control a transient response of the regulator by adjusting a resistance of the control transistor in response to a change in the output voltage.*

*48. The regulator of claim 45, wherein the reference mirror circuit is further configured to receive a reference voltage and to generate the control voltage based, at least in part, on the reference voltage, and wherein the reference voltage is both supply-independent and temperature-independent.*

*49. The regulator of claim 45, further comprising a current source configured to bias the control circuit and the DC-biasing circuit.*

*50. A method, comprising:*

*generating, by a reference mirror circuit, a control voltage;*

*producing, by a control transistor, a control current as a function of a difference between an output voltage of a regulator and the control voltage, wherein the control transistor is coupled to the reference mirror circuit, a pass transistor, and a DC-biasing circuit;*

*controlling, by the DC-biasing circuit, the pass transistor based, at least in part, on the control current to regulate an output voltage of the regulator.*

*51. The method of claim 50, further comprising controlling, by the control transistor, a transient response of the regulator by varying a resistance of the control transistor in response to a change in the output voltage.*

*52. The method of claim 50, further comprising generating, by the reference mirror circuit, the reference voltage based on a temperature-independent and supply-independent reference voltage.*

*53. A system, comprising:*

*a regulator that includes:*

*a pass transistor;*

*a control transistor;*

*a DC-biasing circuit having a first end coupled to a first node of the pass transistor, a second end coupled to a second node of the pass transistor, and a third end coupled to the control transistor;*

*a reference mirror circuit configured to be coupled to a supply-independent and temperature-independent reference voltage, wherein the reference mirror circuit is further configured to generate a control voltage to be applied to the control transistor; and*

*a current source configured to bias the control transistor and the DC-biasing circuit; and*

*an output capacitor coupled to an output node of the regulator.*

*54. The system of claim 53, wherein the output capacitor comprises an output capacitance and an output resistance.*

*55. The system of claim 53, wherein the regulator comprises a low-dropout regulator.*

* * * * *

UNITED STATES PATENT AND TRADEMARK OFFICE

CERTIFICATE OF CORRECTION

PATENT NO. : RE42,335 E
APPLICATION NO. : 12/605206
DATED : May 10, 2011
INVENTOR(S) : Man et al.

It is certified that error appears in the above-identified patent and that said Letters Patent is hereby corrected as shown below:

Title page, item (54), under "Title", in Column 1, Line 1, delete "SINGLE TRANSISTOR" and insert -- SINGLE-TRANSISTOR --.

Column 1, line 1, delete "SINGLE TRANSISTOR" and insert -- SINGLE-TRANSISTOR --.

Column 7, lines 56-57, in Claim 2, delete "Metal-Oxide-Silicon Field-Effect-Transistor" and insert -- Metal-Oxide Silicon Field-Effect Transistor --.

Column 8, lines 33-34, in Claim 10, delete "Metal-Oxide-Silicon Field-Effect-Transistor" and insert -- Metal-Oxide Silicon Field-Effect Transistor --.

Column 9, lines 18-19, in Claim 19, delete "temperature-independence" and insert -- temperature-independent --.

Column 9, lines 29-30, in Claim 21, delete "Metal-Oxide-Silicon Field-Effect-Transistor" and insert -- Metal-Oxide Silicon Field-Effect Transistor --.

Column 10, lines 6-7, in Claim 29, delete "Metal-Oxide-Silicon Field-Effect-Transistor" and insert -- Metal-Oxide Silicon Field-Effect Transistor --.

Column 10, lines 58-59, in Claim 38, delete "temperature-independence" and insert -- temperature-independent --.

Signed and Sealed this
Eleventh Day of October, 2011

David J. Kappos

David J. Kappos
*Director of the United States Patent and Trademark Office*